Jan. 18, 1938.  S. R. FEUER ET AL  2,105,833
CONTINUOUS OUTLET SYSTEM
Filed May 8, 1936  2 Sheets-Sheet 1

INVENTORS
Sidney R. Feuer
Hyman Friedman
Hyman Hozinsky
Arthur Balbinder

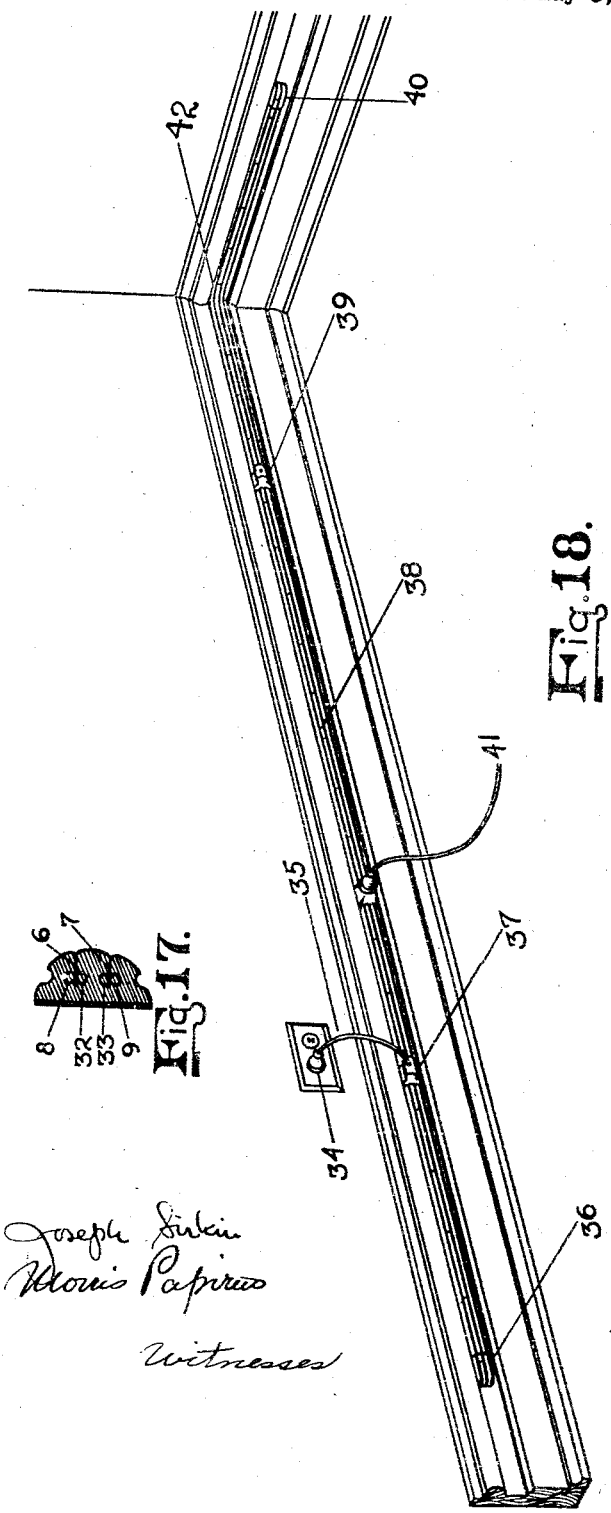

Patented Jan. 18, 1938

2,105,833

UNITED STATES PATENT OFFICE 2,105,833

CONTINUOUS OUTLET SYSTEM

Sidney R. Feuer, Hyman Freedman, Hyman Hozinsky, and Arthur Balbinder, Brooklyn, N. Y.

Application May 8, 1936, Serial No. 78,532

2 Claims. (Cl. 247—3)

The object of our invention is to provide a system of continuous outlets, and appurtenances essential to the proper employment of the system. This invention is to be used in wiring any room, establishment, place or other type of enclosure, so as to permit the use of any type of electrical appliance at any point about such room, establishment, place or other type of enclosure at will, and without the inconvenience and nuisance of unusually long leads or unsightly receptacles.

A further object of the invention is to provide a system of continuous outlets using a flexible molding which will be extremely simple in approved construction, simple to install, inexpensive to manufacture, ornamental in appearance, efficient and durable in use, and which shall provide a maximum of safety by reason of its unusually heavy insulation.

The invention consists of a flexible molding made in any length desired with perforations along its entire length at regularly spaced intervals for the purpose of securing the flexible molding to any surface. It is suggested that this flexible molding be constructed of either a fireproof or a waterproof material or composition, or of some substance or composition containing both these characteristics. The wires are securely embedded in the flexible molding during the process of fabrication, and the molding is provided with slits running its entire length, whose outer openings are so shaped as to conform with the outer surface of the molding, and provide a general harmonious and attractive appearance.

In the fabrication of this flexible molding, two wires may be used to simultaneously carry the power current and produce the necessary contacts as indicated in Figure 1. Also a pair of adjacent wires may be employed to make contact with each prong introduced into the slits of the flexible molding, said wires to be located on either side of each slit as indicated in Figure 17, the additional wires here indicated constituting an embodiment of our invention.

The outlet system as described may be used in conjunction with the following appurtenances:—

A "terminal-insulator" which consists of a small housing fabricated from some insulating material or composition, which will cover the end or ends of any segment of molding and which will fit snugly about it and be perforated so as to provide a means of attachment.

A "segment-connector" which is used to join two segments of flexible molding. This "segment-connector" which is also a "plug", consists of a small molding containing contact prongs and a perforation in the molding to permit the introduction of wires for attachment to the bases of the prongs when the adjunct is employed as a plug.

An "adapter" which consists of a combination plug and individual outlet to which the conventional plug may be attached so that the combination adapter with the plugged-in conventional plug, may be inserted at any point in the flexible molding to tap the current at this point. It is suggested that this adapter be manufactured to accommodate more than one conventional plug.

A further object of our invention is to enable any person without any knowledge of mechanics or electricity to install our system in a minimum of time and without any danger of a short circuit.

With these and other objects in view, there have been illustrated in the accompanying drawings one form of outlet molding, with a cross section view of an embodiment thereto, two forms of plug, one of which is also a connector, and the other an adapter, a terminal insulator and a perspective view of a section of base molding showing our installed system.

A further object of our invention is to provide all the appurtenances with a locking device consisting of two tongues which lock in grooves in the flexible molding when snapped over the foremost edges of the grooves in the flexible molding and thus insure a firm grip.

In the fabrication of this flexible molding, two wires may be used as indicated in Figure 1 to produce the necessary contact. Also a pair of wires may be employed for each point of contact, the wires of said pair to be located respectively on either side of the slit as illustrated in Figure 17.

With these and other objects in view, the invention consists of the construction and arrangement of parts as illustrated in the accompanying drawings.

Figures 1, 2, and 3 are respectively, perspective, face and sectional views of a segment of our flexible molding;

Figure 17 is a sectional view of an embodiment to our flexible molding; and

Figure 18 is a perspective view of a section of the baseboard of a room with the suggested installation of our flexible molding and the employment of our appurtenances.

Figure 1:
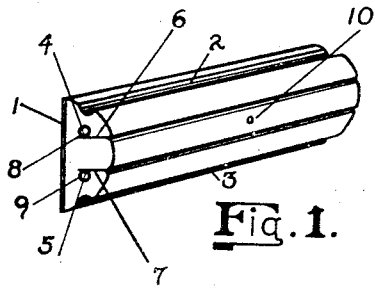
Figure 2:
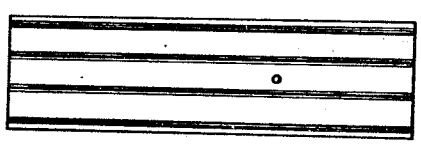

With reference to Figure 1, numeral 1 is a suggested back of canvas or some other material for the purpose of adding tensile strength to the flexible molding. Numerals 2 and 3 are grooves in the sides of molding which may be provided to enable our appurtenances to firmly grip the flexible molding when applied. Numerals 4 and 5 indicate the points at which contact is made by the plugs and connector with wires 8 and 9 through slits 6 and 7. Numeral 10 is a perforation to provide means of securing the flexible molding to any surface.

Figure 7:
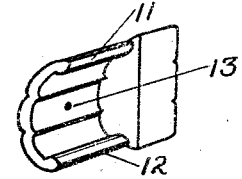
Figure 7 is a perspective view showing the inside of this terminal-insulator.

The function of the insulator-terminal as represented by Figures 4, 5, 6, and 7 is to permit the secure attachment of an insulated block over the end of any cut segment of flexible molding. This attachment is accomplished by means of tongues 11 and 12 which fit snugly into grooves 2 and 3 as indicated in Figure 1. Numeral 13 of Figure 7 is a perforation to provide means of further securing this adjunct to the flexible molding.

Figure 8:
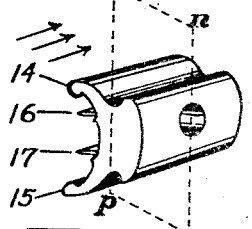
Figures 8 and 9 are respectively, perspective and face views of our connector and plug.
Figure 9:
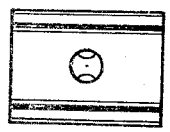

Numerals 14 and 15 of Figure 8 indicate the tongues whereby a firm grip is secured by the connector and plug to the flexible molding.

Figure 3:
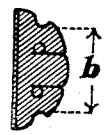
Figure 4:
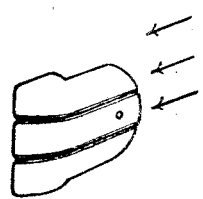
Figures 4 and 5 are respectively, perspective and face views of our terminal-insulator.
Figure 5:
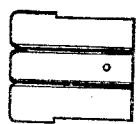
Figure 6:
Figure 6 is an end view of this terminal-insulator looking in the direction of the arrows in Figure 4.

The space between the tongues of any of our appurtenances is always less than the distance between the insides of the grooves 2 and 3 of our flexible molding as indicated by the space between the arrows embracing letter "b" of Figure 3. The purpose of this is to contract the flexible molding when a plug or connector as shown in Figures 8, 9, 10, and 11 or an adapter as shown in Figures 12, 13, 14, and 15 is inserted in our flexible molding so that the wires carrying the current are pressed firmly against the prongs of these appurtenances thereby insuring good contact.

Figure 10:
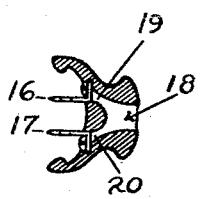
Figure 10 is a sectional view of this connector and plug taken along the plane $m$—$n$—$o$—$p$ of Fig. 8 and looking in the direction of the arrows.
Figure 11:
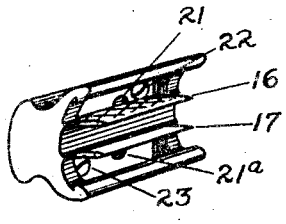
Figure 11 is a perspective view showing the prongs.

With reference to Figures 8, 10, and 11, numerals 16 and 17 indicate the prongs which will carry the current from one segment of flexible molding to another when the device is used to connect two segments of flexible molding and which will tap the current at any point in the flexible molding when the device is used as a plug for an electric appliance.

With reference to Figures 10 and 11 of our connector and plug, arrow 18 of Figure 10 points to the opening through which a wire must be inserted when the device is used as a plug. In this case, the separated terminals of the wire proceed through the openings 19 and 20 of Figure 10 and thence through the perforations in the prong units at 21 and 21a of Figure 11 to the binding posts 22 and 23 of Figure 11.

Figure 12:
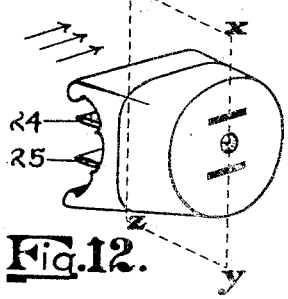
Figures 12 and 13 are respectively, perspective and face views of our adapter.
Figure 13:
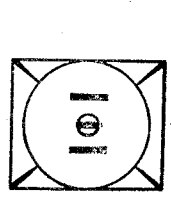
Figure 14:
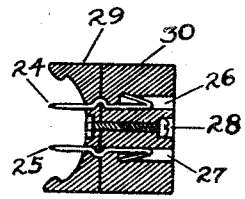
Figure 14 is a sectional view of this adapter, taken along the plane w—x—y—z of Fig. 12 and looking in the direction of the arrows.
Figure 15:
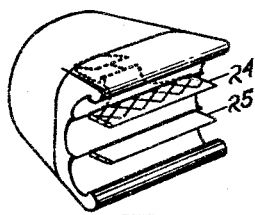
Figure 15 is a perspective view of this adapter showing the prongs.

With reference to Figures 12, 14, and 15, numerals 24 and 25 indicate the contact prongs of the adapter. With reference to Figure 14, numerals 26 and 27 are the openings through which the prongs of a conventional plug are introduced to make contact with the inside extremities of prongs 24 and 25 of the adapter.

Numeral 28 designates a nut and bolt arrangement by which sections 29 and 30 of the adapter are joined.

Figure 16:
Figure 16 is a perspective view of one of the prongs used in this adapter.

With reference to Figure 16, numeral 31 indicates a suggested roughened surface or surfaces of a prong to provide better contact with the wire or wires in our flexible molding.

In the modified form of our improved flexible molding shown in Figure 17, two pairs of parallel adjacent wires 8, 32 and 9, 33 are respectively employed as the two current carrying and contacting elements of the device. The two wires of each pair, 8 and 32 for example, are embedded in the molding at opposite sides of one of the slits 6 and the surfaces of these wires are exposed in the slit for contact with the opposite sides of a conducting prong of an outlet plug or adapter.

With reference to Figure 18, numeral 38 indicates a length of our flexible molding. Numerals 39 and 40 show the use of two of our terminal insulators. Numeral 39 shows the employment of a connector joining two segments of flexible molding. Numeral 34 illustrates a conventional plug in a receptacle. Numeral 35 illustrates a short length of wire joining the conventional plug 34 with the special plug 37 which is plugged into our flexible molding conveying to it the current from the receptacle. Numeral 41 illustrates our adapter to which may be plugged a conventional plug bearing a length of wire leading to any electrical appliance. Our flexible molding may be easily and neatly bent around a corner as shown at 42. It is suggested that a special unit consisting of the items indicated by numerals 34, 35 and 37 be sold with the flexible molding and other appurtenances for the purpose of facilitating the installation of our system by obviating the necessity of scraping any wires, at any step in the process of installation.

Although the invention has been described by reference to certain specific embodiments thereof, it should be understood that the invention is not limited to the particular constructions and arrangements shown, but may include all such modifications thereof as fall within the scope of the appended claims. Thus, for example, our improved flexible molding may be used as an outlet device by inserting the conventional outlet plugs therein, as well as by the use of special plugs and adapters.

Having thus described our invention, what we claim as new, and desire to protect by Letters Patent is:

1. A continuous electrical conduit and outlet device comprising an elongated molding of solid flexible electrical insulating material having a pair of longitudinally extending laterally spaced parallel slits therein penetrating from the outer face of said molding to points short of the inner surface thereof, electrical conducting means embedded in said molding and extending longitudinally thereof adjacent the bottoms of each of said slits and exposed to the interiors of said slits and plug means for making electrical contact with said conducting means comprising an insulating member carrying a pair of spaced conductive prongs extending respectively into said molding slits and contacting said conducting means and tongue means on said insulating member compressively engaging opposite side surfaces of said molding whereby said conductive prongs are gripped in said slits and pressed in firm engagement with said conducting means.

2. A continuous electrical conduit and outlet device comprising an elongated molding of solid flexible electrical insulating material having longitudinal grooves along its opposite side surfaces, said molding having a pair of longitudinally extending laterally spaced parallel slits therein penetrating from the outer face of said molding to points short of the inner surface thereof, electrical conducting means embedded in said molding and extending longitudinally thereof adjacent the bottoms of each of said slits and exposed to the interiors of said slits and plug means for connecting an appliance to the conducting means of said molding comprising an insulating member, a pair of spaced conductive prongs on said insulating member extending respectively into said molding slits and contacting the conducting means exposed in said slits, and tongue means on said insulating member compressively engaging the opposite side surface grooves of said molding whereby said conductive prongs are gripped in said slits and pressed against said conducting means and said plug means is secured to said molding.

SIDNEY R. FEUER.
HYMAN FREEDMAN.
HYMAN HOZINSKY.
ARTHUR BALBINDER.